(12) United States Patent
Menard et al.

(10) Patent No.: US 10,657,687 B2
(45) Date of Patent: May 19, 2020

(54) DYNAMIC CHAINING OF DATA VISUALIZATIONS

(71) Applicant: SAP SE, Walldorf (DE)

(72) Inventors: Sarah Menard, Vancouver (CA); Viren Kumar, Vancouver (CA)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/192,041

(22) Filed: Nov. 15, 2018

(65) Prior Publication Data

US 2019/0087991 A1    Mar. 21, 2019

Related U.S. Application Data

(63) Continuation of application No. 15/384,839, filed on Dec. 20, 2016, now Pat. No. 10,147,208.

(51) Int. Cl.
*G06T 11/20* (2006.01)

(52) U.S. Cl.
CPC ........ *G06T 11/206* (2013.01); *G06T 2200/24* (2013.01); *G06T 2207/20092* (2013.01)

(58) Field of Classification Search
CPC ..................................... G06T 11/206
USPC ................................... 345/440–441
See application file for complete search history.

(56) References Cited

U.S. PATENT DOCUMENTS

| | | | |
|---|---|---|---|
| 2014/0267287 A1* | 9/2014 | Dodgen | G06T 11/206 345/440 |
| 2016/0086361 A1* | 3/2016 | Ball | G06Q 10/00 345/440 |
| 2018/0004851 A1* | 1/2018 | Zarins | G06F 16/986 |

* cited by examiner

*Primary Examiner* — Ryan R Yang
(74) *Attorney, Agent, or Firm* — Buckley, Maschoff & Talwalkar LLC

(57) ABSTRACT

A system includes reception of a selection of a point of a first data visualization associated with a first measure value, reception of an instruction from the user to create a visualization based on the first measure value, determination of a first context of the first measure value, the first context comprising one or more dimension values, generation of a first numeric point visualization of the first measure value based on the first context, and presentation of a first interface comprising the first data visualization and the first numeric point visualization, where the first numeric point visualization is presented in association with the selected first measure of the first data visualization.

20 Claims, 16 Drawing Sheets

DYNAMIC CHAINING OF DATA VISUALIZATIONS

CROSS-REFERENCE TO RELATED APPLICATIONS

This application is a continuation of U.S. patent application Ser. No. 15/384,839, filed on Dec. 20, 2016, in the United States Patent and Trademark Office, the entire disclosure of which is incorporated herein for all purposes.

BACKGROUND

Enterprise software systems receive, generate, and store data related to many aspects of an enterprise. Users operate reporting tools to access such data and display the data in graphic visualizations. Typically, a user operates a reporting tool to define attributes (e.g., Sales by Country) of a desired result set and a type of visualization (e.g., bar graph, pie chart, line chart) which will be used to present the result set.

Some reporting tools allow a user to change the attributes of a displayed visualization. In response to such changes, the displayed visualization is modified to present a new result set. Moreover, the data of a displayed visualization may be expanded or collapsed (i.e., drilled-down or rolled-up) by manipulating the visualization using a mouse or other input device.

A user may require multiple visualizations to sufficiently analyze data and/or to illustrate findings derived from the data. Conventionally, each of the multiple visualizations must be created independently. While some systems may allow copying of an existing visualization and application of modifications thereto, such an approach provides only modest efficiency gains, and is unsuitable for intuitively exploring stored data and/or illustrating relationships therebetween.

DETAILED DESCRIPTION

The following description is provided to enable any person in the art to make and use the described embodiments. Various modifications, however, will remain readily apparent to those in the art.

Generally, some embodiments provide efficient generation of data visualizations and/or illustration of relationships therebetween. According to some embodiments, modification of a context of one displayed visualization results in automatic modification of any related displayed visualizations.

Figure 1:
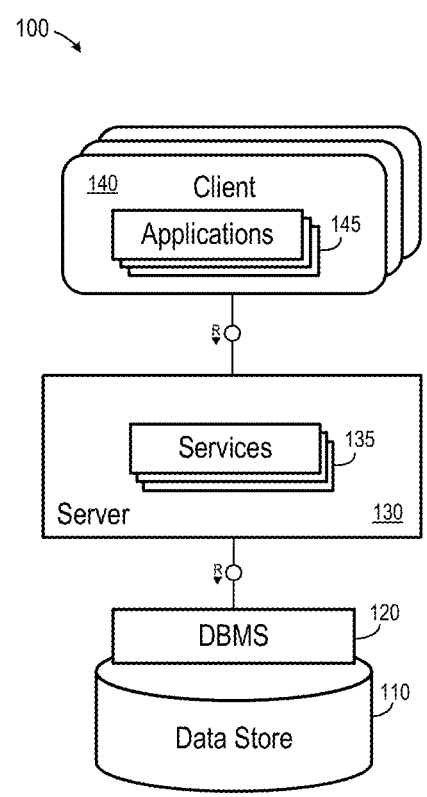
FIG. 1 is a block diagram of a system architecture according to some embodiments.

FIG. 1 is a block diagram of architecture 100 according to some embodiments. Embodiments are not limited to architecture 100 or to a database architecture.

Architecture 100 includes data store 110, database management system (DBMS) 120, server 130, services 135, clients 140 and applications 145. Generally, services 135 executing within server 130 receive requests from applications 145 executing on clients 140 and provides results to applications 145 based on data stored within data store 110.

More specifically, server 130 may execute and provide services 135 to applications 145. Services 135 may comprise server-side executable program code (e.g., compiled code, scripts, etc.) which provide functionality to applications 145 by providing user interfaces (e.g., in eXtended Markup Language (XML), HyperText Markup Language (HTML) and/or JavaScript) to clients 140, receiving requests from applications 145, retrieving data from data store 110 based on the requests, processing the data received from data store 110, and providing the processed data to applications 145. Services 135 may be made available for execution by server 130 via registration and/or other procedures which are known in the art.

In one specific example, a client 140 executes an application 145 to present a user interface to a user on a display of the client 140. The user manipulates the user interface to specify elements of a query consisting of one or more dimensions and/or one or more measures. The query may also include other information such as filters. The application passes a request based on the query to one of services 135. An SQL script is generated based on the request and forwarded to DBMS 120. DBMS 120 executes the SQL script to return a result set based on data of data store 110, and the application 145 generates and displays a report/visualization based on the result set.

The query may leverage a semantic layer defining a set of objects. The semantic layer may be defined by metadata stored within data store 110 and/or a separate repository (not shown). Each object associates one or more physical entities (e.g., a physical database table, associated columns of one or more database tables, etc.) of data store 110 with user-friendly names. These objects may be classified as dimensions, along which one may perform an analysis or report (e.g., Year, Country, Product), or measures (e.g., Sales, Profit), whose values can be determined for a given combination of dimension values (e.g., 2006, U.S.A., Televisions). The metadata may include information regarding dimension hierarchies (e.g., Country>State>City) and any other suitable metadata. Accordingly, a user-generated query may include thusly-defined dimensions, dimension values and/or measures, and corresponding metadata is used to execute the query with respect to the corresponding physical entities of data store 110. As mentioned above, the query may also include other information such as filters.

Server 130 provides any suitable protocol interfaces through which applications 145 executing on clients 140 may communicate with services 135 executing on application server 130. For example, server 130 may include a HyperText Transfer Protocol (HTTP) interface supporting a transient request/response protocol over Transmission Control Protocol (TCP), and/or a Web Socket interface supporting non-transient full-duplex communications between server 130 and any clients 140 which implement the Web-Socket protocol over a single TCP connection.

One or more services 135 executing on server 130 may communicate with DBMS 120 using database management interfaces such as, but not limited to, Open Database Connectivity (ODBC) and Java Database Connectivity (JDBC) interfaces. These types of services 135 may use Structured Query Language (SQL) to manage and query data stored in data store 110.

DBMS 120 serves requests to query, retrieve, create, modify (update), and/or delete data of data store 110, and also performs administrative and management functions. Such functions may include snapshot and backup management, indexing, optimization, garbage collection, and/or any other database functions that are or become known. DBMS 120 may also provide application logic, such as database procedures and/or calculations, according to some embodiments. This application logic may comprise scripts, functional libraries and/or compiled program code.

Server 130 may be separated from or closely integrated with DBMS 120. A closely-integrated server 130 may enable execution of services 135 completely on the database platform, without the need for an additional server. For example, according to some embodiments, server 130 provides a comprehensive set of embedded services which provide end-to-end support for Web-based applications. The services may include a lightweight web server, configurable support for Open Data Protocol, server-side JavaScript execution and access to SQL and SQLScript.

Data store 110 may comprise any query-responsive data source or sources that are or become known, including but not limited to a structured-query language (SQL) relational database management system. Data store 110 may comprise a relational database, a multi-dimensional database, an XML document, or any other data storage system storing structured and/or unstructured data. The data of data store 110 may be distributed among several relational databases, dimensional databases, and/or other data sources. Embodiments are not limited to any number or types of data sources.

In some embodiments, the data of data store 110 may comprise one or more of conventional tabular data, row-based data, column-based data, and object-based data. Moreover, the data may be indexed and/or selectively replicated in an index to allow fast searching and retrieval thereof. Data store 110 may support multi-tenancy to separately support multiple unrelated clients by providing multiple logical database systems which are programmatically isolated from one another.

Data store 110 may implement an "in-memory" database, in which a full database stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Each of clients 140 may comprise one or more devices executing program code of an application 145 for presenting user interfaces to allow interaction with server 130. The user interfaces of applications 145 may comprise user interfaces suited for reporting, data analysis, and/or any other functions based on the data of data store 110.

Presentation of a user interface as described herein may comprise any system to render visualizations. For example, a client 140 may execute a Web Browser to request and receive a Web page (e.g., in HTML format) from application server 130 via HTTP, HTTPS, and/or Web Socket, and may render and present the Web page according to known protocols. In another example, an application 145 may comprise a user interface component and an engine component. The user interface component transmits JavaScript calls to the engine component in response to user interactions and the engine component transmits corresponding HTTP calls to server 130. The engine component receives XML, HTML and/or JavaScript from server 130 in response, and provides corresponding HTML and custom style sheet (CSS) data to the user interface component for rendering thereby. Such an implementation may allow data exchange and presentation without requiring full page reloads.

Figure 2:
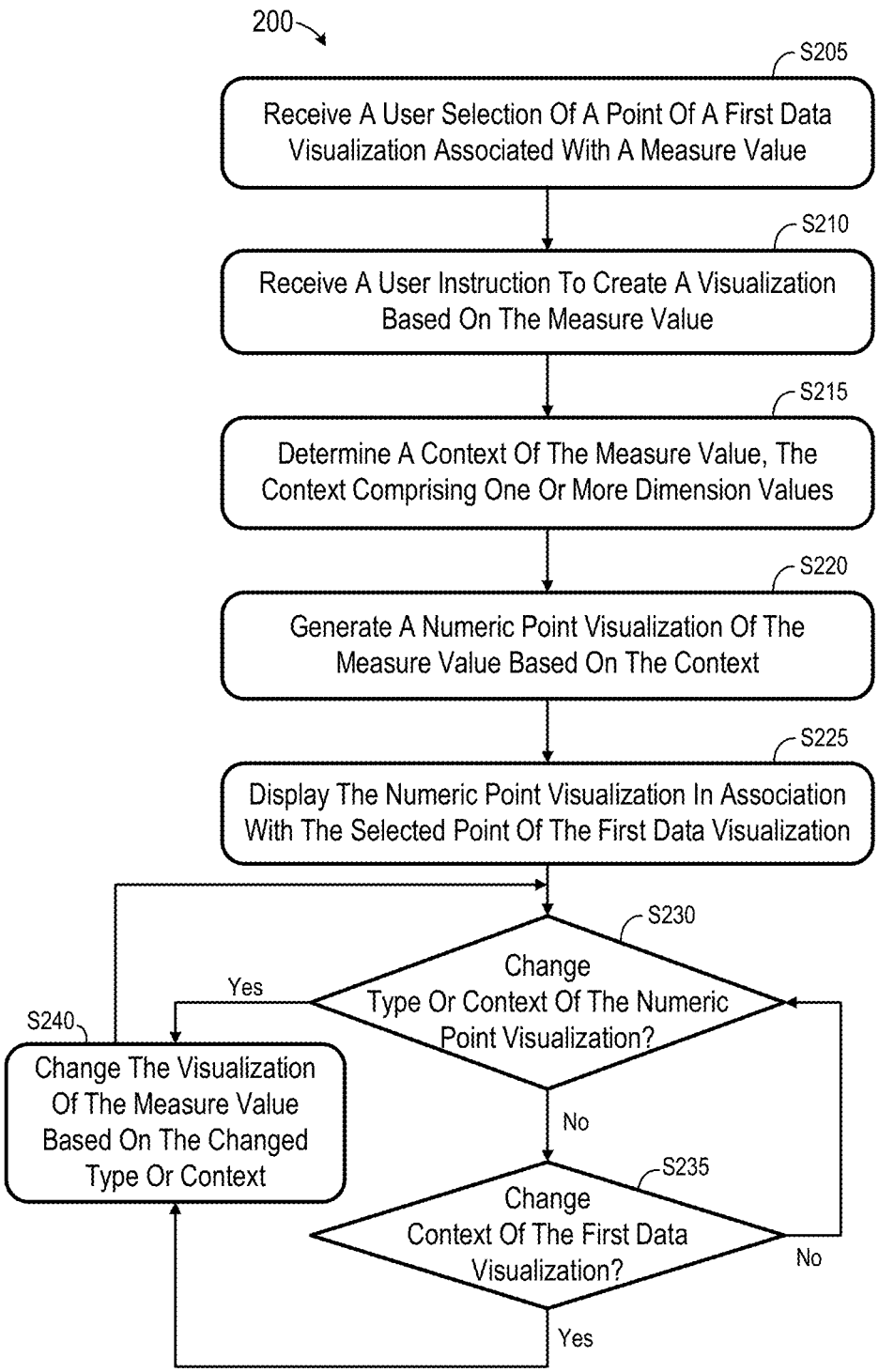
FIG. 2 is a flow diagram of a process according to some embodiments.

FIG. 2 comprises a flow diagram of process 200 according to some embodiments. Process 200 may be executed to efficiently spawn a visualization from another visualization, and/or to illustrate and leverage logical linkages between two or more visualizations.

In some embodiments, various hardware elements of system 100 execute program code to perform process 200. Process 200 and all other processes mentioned herein may be embodied in computer-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, at S205, a user selection of a point of a first data visualization is received. The point is associated with a first measure value. Accordingly, prior to S205, the first data visualization is presented to the user.

Figure 3:
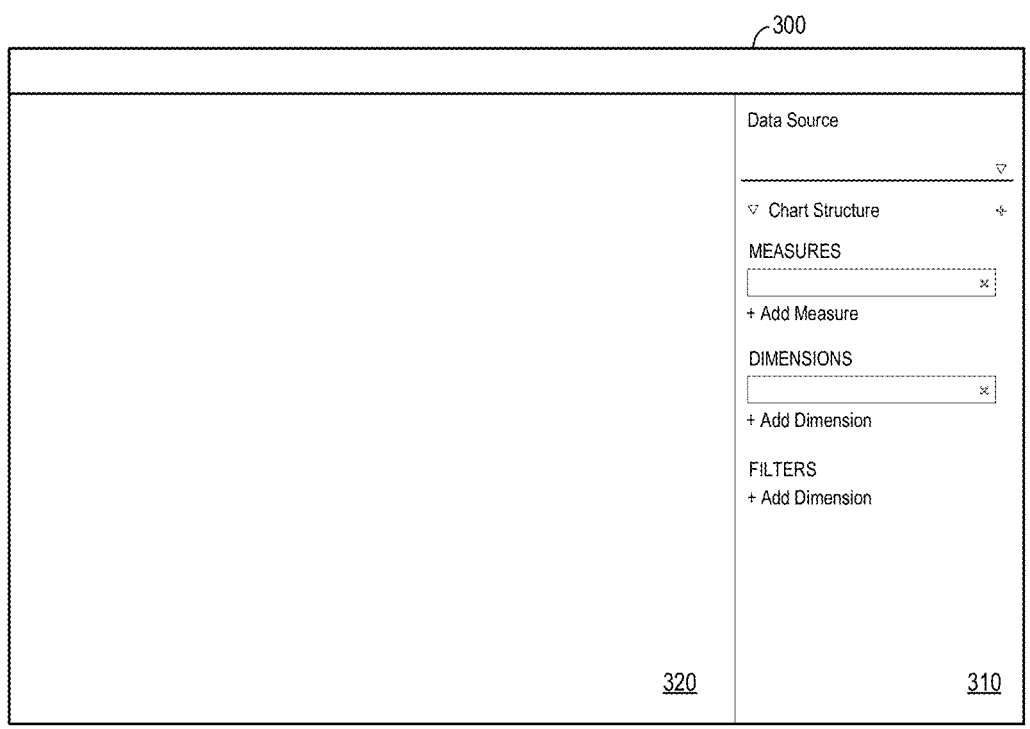
FIG. 3 is an outward view of a displayed user interface according to some embodiments.

According to some embodiments, the first visualization is generated and presented based on input from the user. FIG. 3 illustrates interface 300 to receive such input according to some embodiments. Embodiments are not limited to interface 300. Interface 300 may comprise a Web page provided by server 130 in response to a request from a Web browser application 145 executing on client 140. Any client application 145 may be used to display interface 300, which is not limited to Web-based formats.

Interface 300 includes visualization definition area 310 to receive metadata of a visualization. Area 310 includes fields which allow a user to specify a data source, a chart structure (e.g., pie, line, bar, etc.), one or more measures, one or more dimensions, and one or more filters. Embodiments may utilize any user interface metaphor for receiving visualization metadata from a user.

Figure 4:
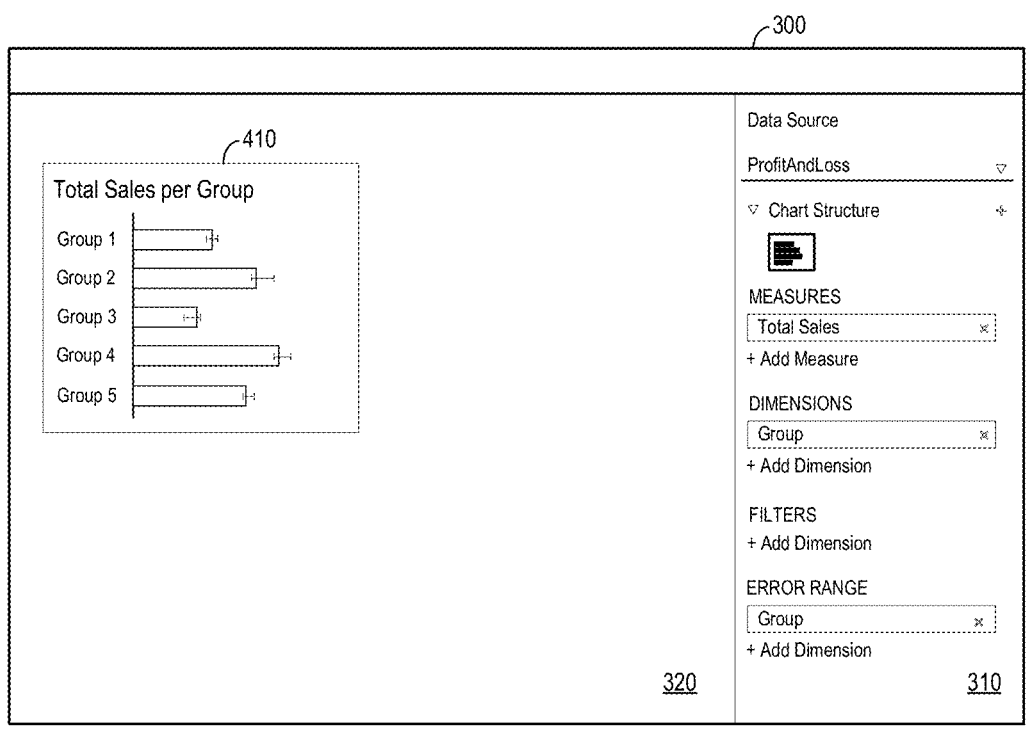
FIG. 4 is an outward view of a displayed user interface according to some embodiments.

FIG. 4 illustrates interface 300 after input of visualization metadata into area 310 according to some embodiments. A user has selected a data source (i.e., ProfitAndLoss), a bar chart structure, the measures Total Sales and the dimension Group. As described above, and according to some embodiments, server 130 may receive metadata defining the dimensions and measures of a query (e.g., the metadata input into area 310), generate an SQL script based on the metadata, and forward the script to DBMS 120. DBMS 120 executes the SQL script to return result sets to an application 145 based on data of data store 110 (e.g., the data associated with data source ProfitAndLoss), and application 145 presents a visualization based on the result sets. The visualization may be rendered on server 130 or may be transmitted to client 140 as XML, HTML and JavaScript for rendering thereon as described above.

Visualization 410 is generated and displayed in area 320 based on the metadata of area 310. Visualization 410 includes a bar for each Group corresponding to a value of the Total Sales measure for the Group. Each bar is also associated with a graphical depiction of its associated error range, as specified in area 310.

Figure 5:
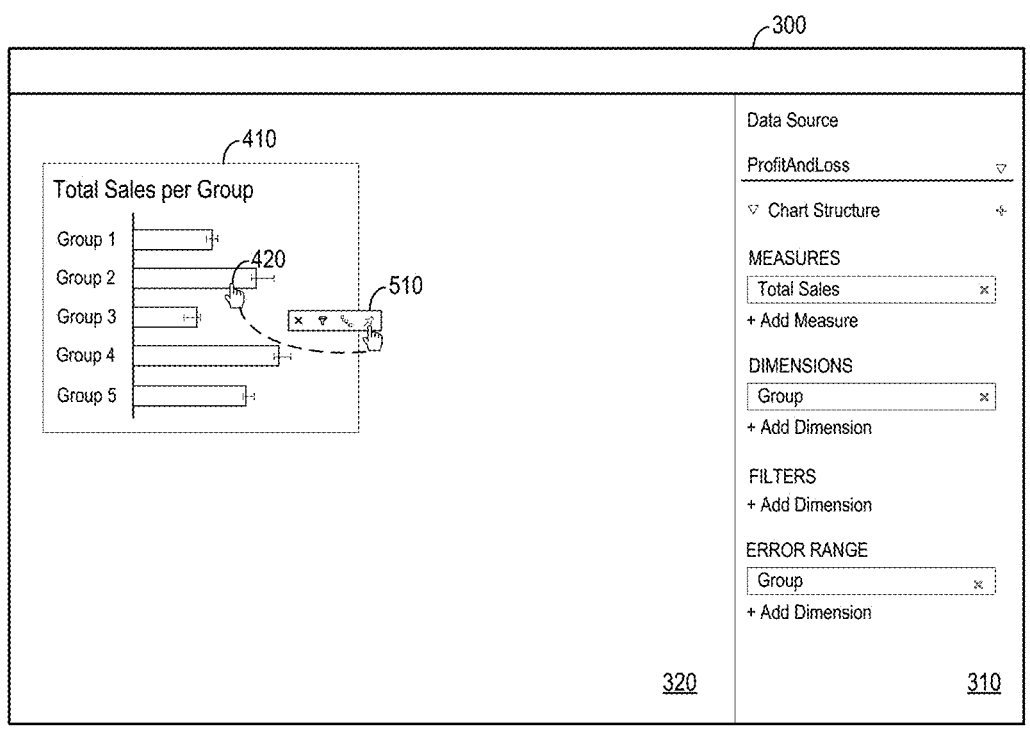
FIG. 5 is an outward view of a displayed user interface according to some embodiments.

FIG. 5 depicts user selection of a point of visualization 410 at S205 according to some embodiments. The selected point 420 is associated with the specific value of the Total Sales measure which is associated with the Group 2 dimension value (i.e., the amount of Total Sales for Group 2). According to some embodiments, selection of the point results in display of menu 510.

Next, at S210, a user instruction to create a visualization based on the context of the selected measure value is received. Continuing with the present example, the user may, as also depicted in FIG. 5, select a Pin icon of menu 510 to issue the user instruction which is received at S210. Embodiments are not limited to the controls of user interface 300. For example, the instruction of S210 may be issued by selecting a corresponding function from a main pull-down menu of interface 300.

A context of the measure value is determined at S215 in response to the received instruction. The context includes one or more dimension values, and may also include any filters applied to the dimensions or measures in generating the visualization, as well as any other information associated with the measure and dimensions such as an error range, etc. In the present example, the context includes the dimension Group, the dimension value Group 2, the measure Total Sales and an error range associated with the selected value of the Total Sales measure.

Figure 6:
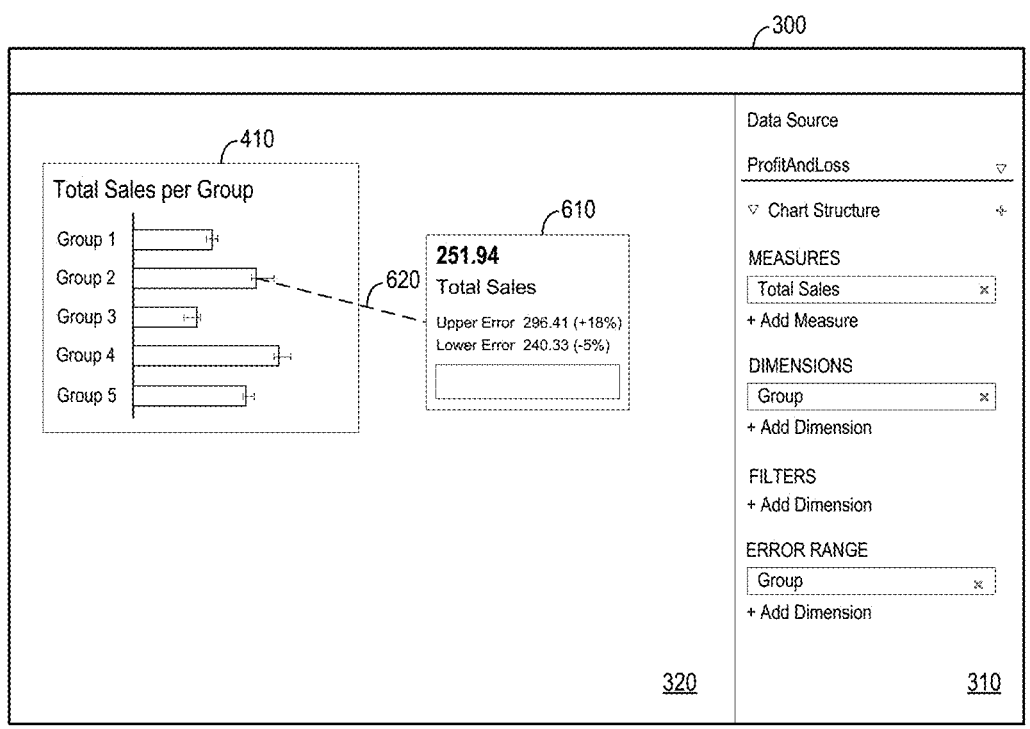
FIG. 6 is an outward view of a displayed user interface according to some embodiments.

A numeric point visualization of the measure is generated at S220 based on the determined context, and the numeric point visualization is displayed in association with the selected point of the first data visualization at S225. FIG. 6 illustrates numeric point visualization 610 generated at S220 and displayed in area 320 of user interface 300 at S225 according to some embodiments.

Numeric point visualization 610 presents the measure value (i.e., 251.94) of the selected point and the name of the associated measure (i.e., Total Sales). In the present example, visualization 610 also includes an upper error value and a lower error value associated with the measure value within the data source (i.e., ProfitAndLoss). A text box is provided in which the user may enter any desired annotation, examples of which are described below.

Figure 7:
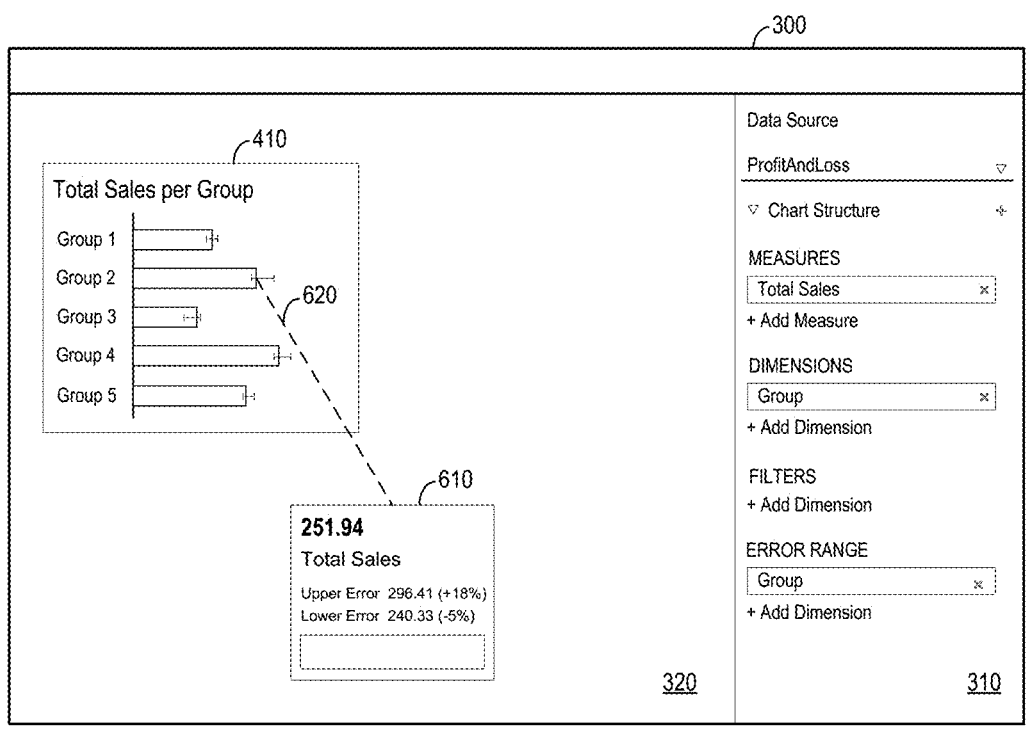
FIG. 7 is an outward view of a displayed user interface according to some embodiments.
Figure 8:
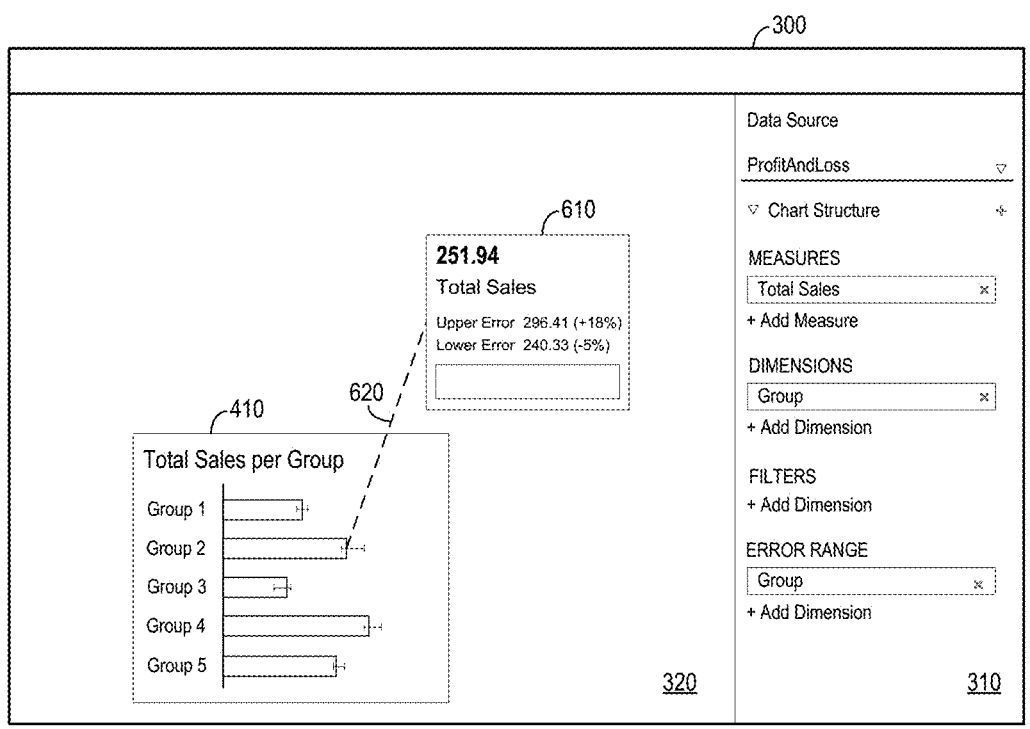
FIG. 8 is an outward view of a displayed user interface according to some embodiments.

Dashed line 620 illustrates a logical linkage between the selected point of visualization 410 and visualization 610. According to some embodiments, line 620 is preserved regardless of how visualizations 410 and 610 may be moved relative to one another. For example, FIG. 7 illustrates repositioning of line 620 in response to the user dragging visualization 610 downward and to the left from its position shown in FIG. 6. Similarly, FIG. 8 illustrates repositioning of line 620 in response to the user dragging visualization 410 downward and to the right from its position shown in FIG. 6. In all cases, line 620 illustrates a logical linkage between the selected point of visualization 410 and visualization 610.

Returning to process 200, flow cycles between S230 and S235 until it is determined that the user has changed the type or context of the numeric point visualization (at S230) or that the user has changed the context of the first data visualization (at S235).

Figure 9:
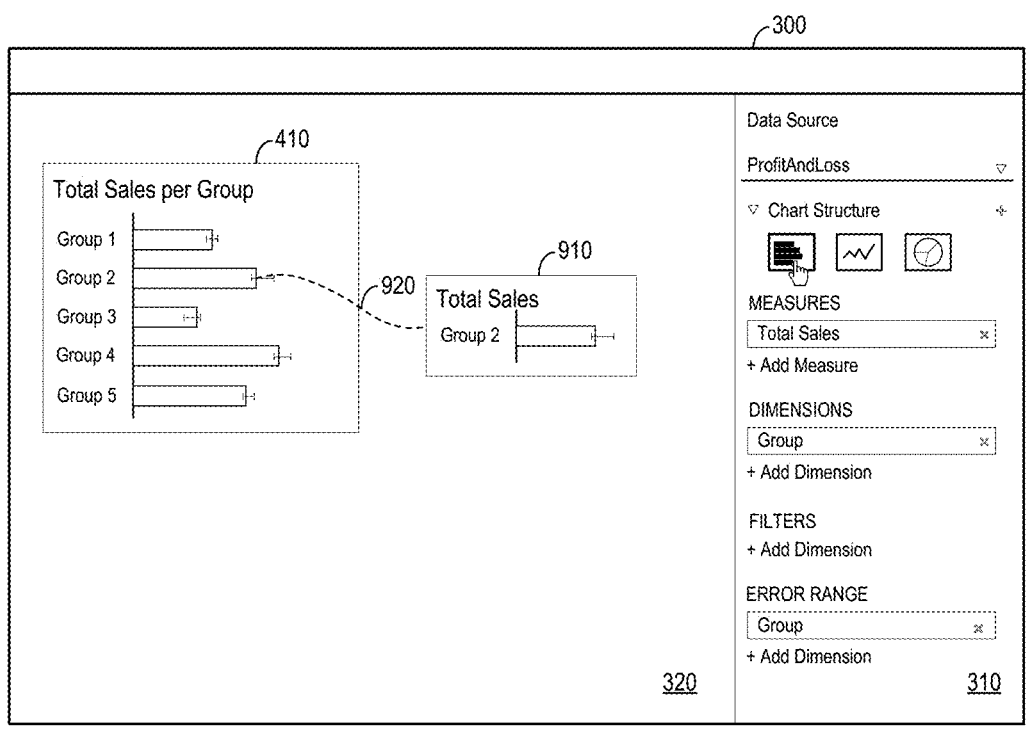
FIG. 9 is an outward view of a displayed user interface according to some embodiments.

FIG. 9 illustrates a scenario in which the user has selected a bar chart structure in area 310 while the numeric point visualization is highlighted. Accordingly, flow proceeds from S230 to S240 to change visualization 610 based on the changed type, resulting in bar chart 910. Notably, bar chart 910 represents the same dimension value, measure value and error range as was depicted by visualization 610, albeit in chart form. Moreover, dashed line 920 illustrates the linkage between visualization 410 and visualization 910.

Figure 10:
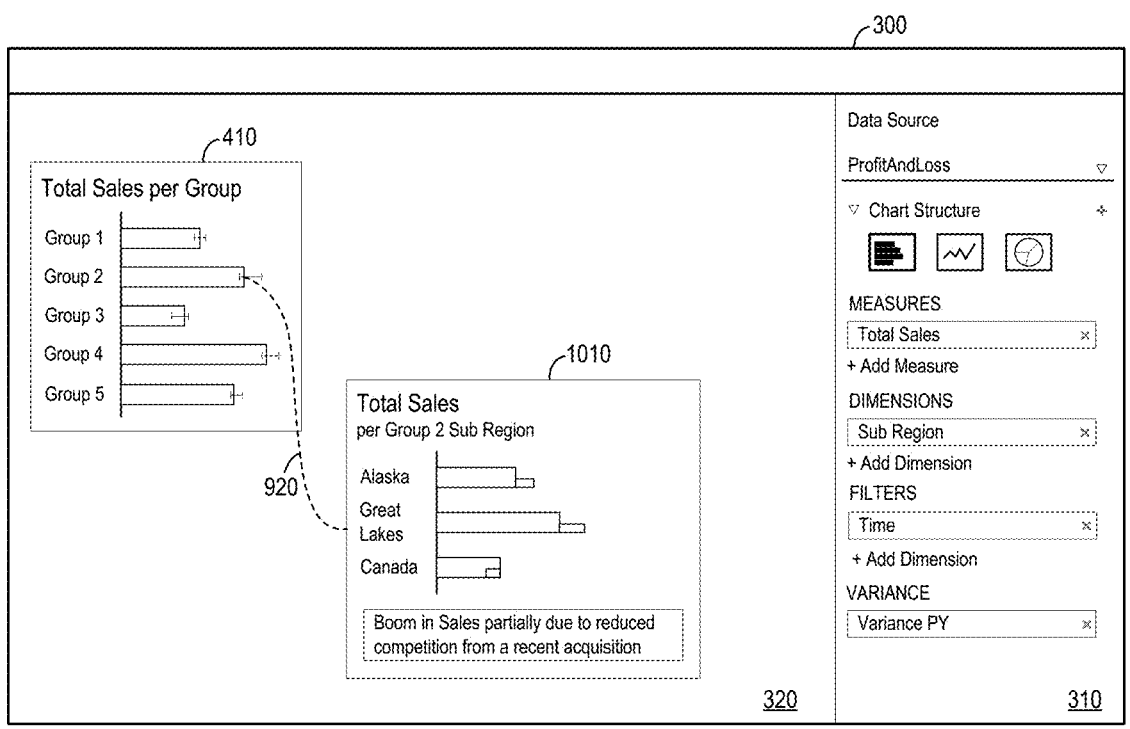
FIG. 10 is an outward view of a displayed user interface according to some embodiments.

Flow then returns to cycle through S230 and S235 as described above. Next, as illustrated in FIG. 10, the user has, while visualization 1010 is highlighted, changed the dimension of the visualization to Sub Region, added a Time filter (e.g., December 2015), and specified display of a prior year variance. Flow therefore proceeds to S240 to change visualization 910 to visualization 1010 based on the new metadata of area 310. It is noted that the sub-regions of visualization 1010 are sub regions of Group 2, per the original context of numeric point visualization 410.

The variances with respect to prior year values of the same measure (in the same context) are illustrated by the smaller bars at the end of each illustrated bar. Moreover, the user has entered text into the text box of visualization 1010 to provide an explanation for the data depicted thereby.

More than one visualization may be "chained" in some embodiments. That is, a numeric point visualization may be generated from a visualization which itself was generated initially as a numeric point visualization. In other words, several instances of process 200 may execute in parallel, with the "first" data visualization of one instance being a numeric chart visualization which was spawned and changed during execution of another instance.

Figure 11:
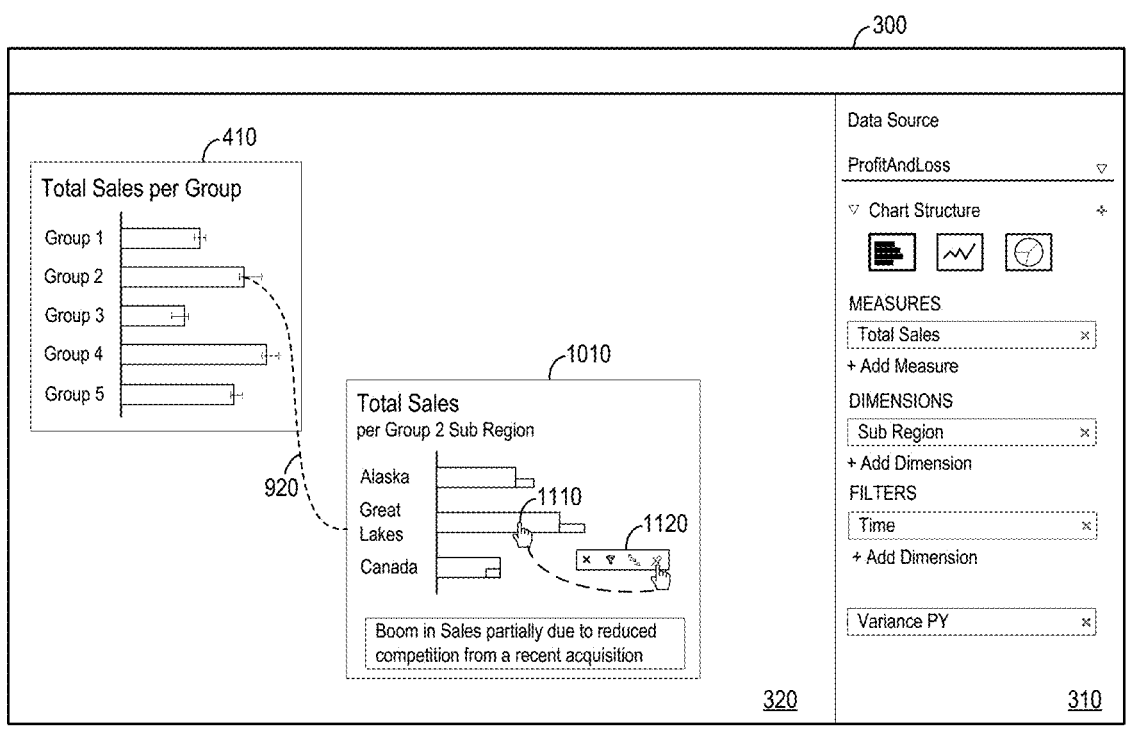
FIG. 11 is an outward view of a displayed user interface according to some embodiments.
Figure 12:
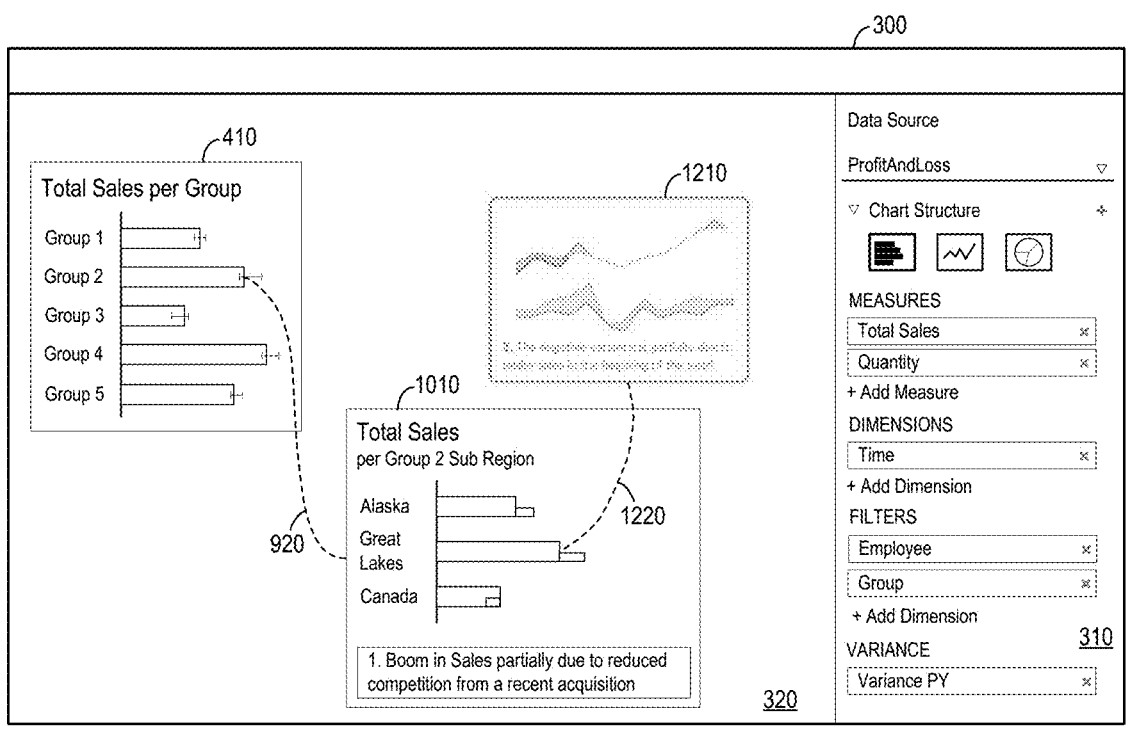
FIG. 12 is an outward view of a displayed user interface according to some embodiments.
Figure 13:
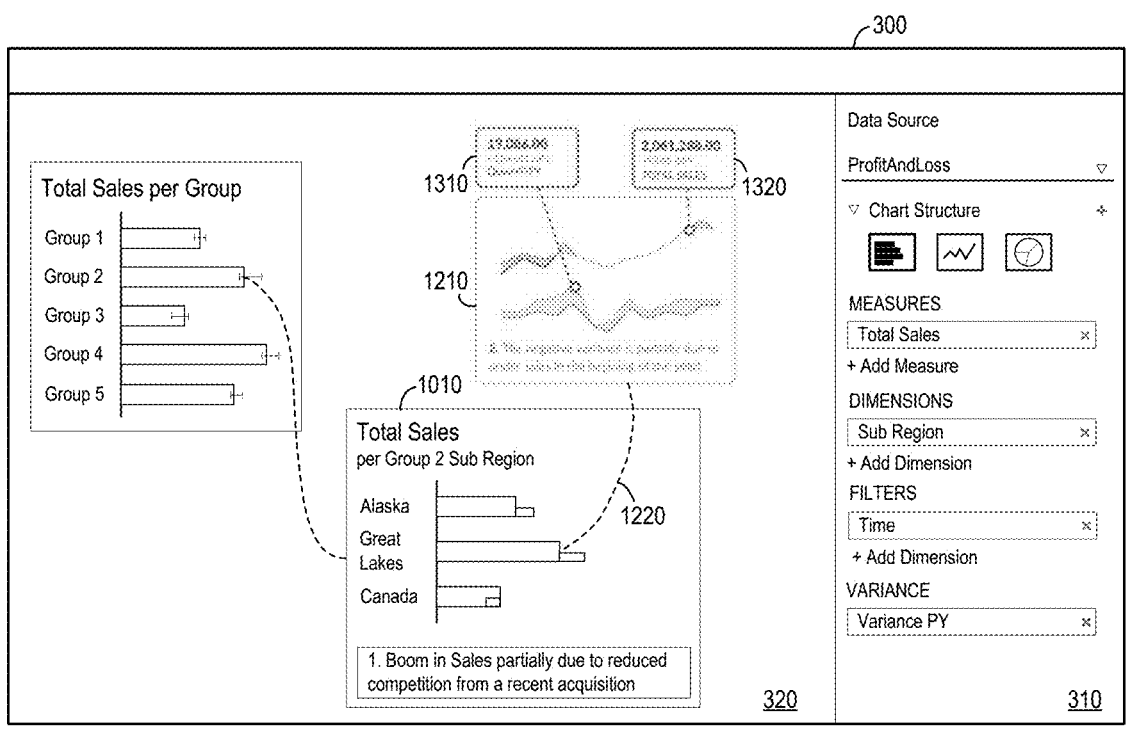
FIG. 13 is an outward view of a displayed user interface according to some embodiments.

FIGS. 11 through 13 illustrate such chaining according to some embodiments. Specifically, FIG. 11 illustrates user selection of point 1110 of visualization 1010. Point 1110 is associated with a specific value of the Total Sales measure which is associated with the Great Lakes Sub Region of Group 2. As described above with respect to S205, selection of point 1110 results in display of menu 1120. As also illustrated, the user select the Pin icon of menu 1120 to issue a user instruction to create a visualization based on the selected measure value.

A context of the selected measure value is determined as described above with respect to S215 in response to the received instruction. In the present example, the context includes the dimension Group, the dimension value Group 2, the dimension Sub Region, the dimension value Great Lakes, the measure Total Sales and the variance associated with the selected value of the Total Sales measure. A numeric point visualization of the selected measure value is generated at S220 based on the determined context, and the numeric point visualization is displayed in association with the selected point of the first data visualization at S225. As described above, the numeric point visualization may be displayed in conjunction with a line connecting the selected measure value to the numeric point visualization.

Such a numeric point visualization may be further manipulated to change its context as described above with respect to S230 and S235. FIG. 12 illustrates visualization 1210, which was generated at S220 and displayed in area 320 of user interface 300 at S225 as a numeric point visualization according to some embodiments. The type and context of the visualization was subsequently changed by the user at S230 to add the dimension Time and the measure Quantity, to change the visualization from a numeric point visualization to a line chart, and to add variance to the Quantity measure. The user has entered text into the text box of visualization 1210 to provide an explanation for the data depicted thereby. Dashed line 620 illustrates a logical linkage between the selected point of visualization 1010 and visualization 610.

Still further chaining may occur according to some embodiments. FIG. 13 illustrates numeric point charts 1310 and 1320 which were generated and displayed as described above by selecting points of visualization 1210 which are associated with particular measure values. As illustrated, and by virtue of some embodiments, visualizations may be spawned from other visualizations and subsequently manipulated to provide data exploration and analysis in a more efficient manner than is conventionally available.

According to some embodiments, it may be determined that the context of the first data visualization is changed at S240. Such a change may result in a change of all visualizations spawned therefrom at S235. The change to the first data visualization may comprise a change to the data underlying the first data visualization, or the application of a filter to the data of the first data visualization, each of which may change the magnitude of the selected measure value.

Figure 14:
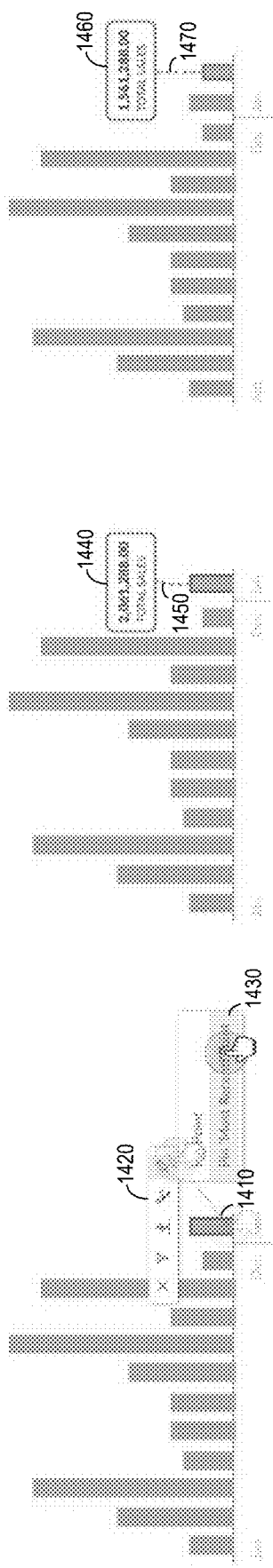
FIG. 14 illustrates generation and display of a numeric point chart associated with a most-recent measure value according to some embodiments.

In some embodiments, the selected measure value may change dynamically at S240, resulting in corresponding changes to all visualizations spawned therefrom at S235. For example, FIG. 14 illustrates user selection of a point associated with measure value 1410 and subsequent selection of a Pin icon from menu 1420. The user is further presented with and selects "Pin Most Recent Point" option 1430. In response, numeric point chart 1440 and line 1450 are generated and displayed as described above. If the visualization is updated, either automatically or through user intervention, to display a more recent measure value than the originally-selected value, the original visualization and line are deleted and another numeric point visualization 1460 is generated based on the more recent measure value, along with a line 1470 associating the new numeric point visualization with the more recent measure value.

Figure 15:
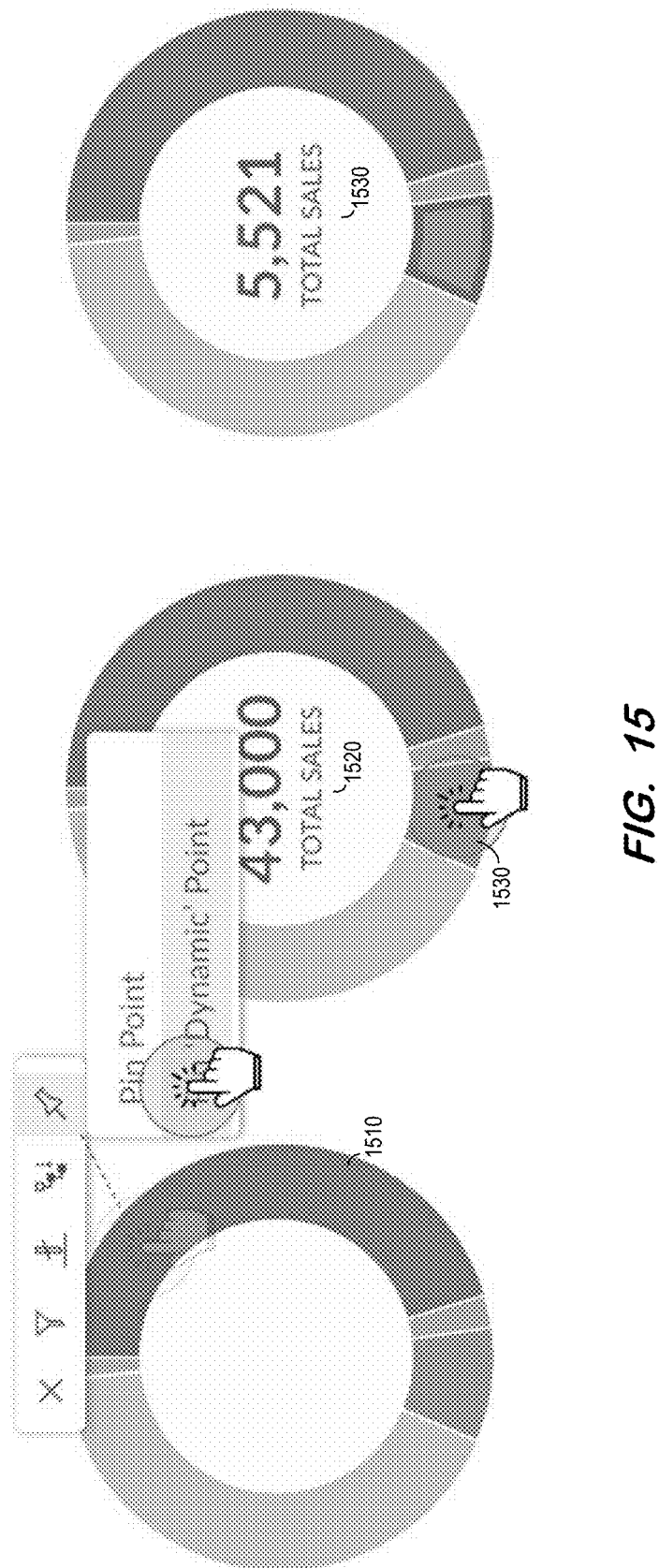
FIG. 15 illustrates generation and display of a numeric point chart associated with a subsequently-selected measure values according to some embodiments.

In some embodiments, selection of a second point associated with a second measure value does not result in generation of a second numeric point chart. Rather, if a first selected point associated with a first measure value is indicated as "dynamic" by the user, then subsequent selections of points associated with the measure value merely update the originally-displayed chart. For example, FIG. 15 illustrates initial selection of measure value 1510 and generation of numeric point visualization 1520 based thereon. As shown, the selected point has been specified as a "dynamic point". Therefore, in response to selection of a point associated with measure value 1530, numeric point visualization 1520 is updated as numeric point chart 1530, reflecting the newly-selected measure value. Some embodiments may omit presentation of a line associating the numeric point visualization with a measure value, since the associated measure value changes in response to user selections.

Figure 16:
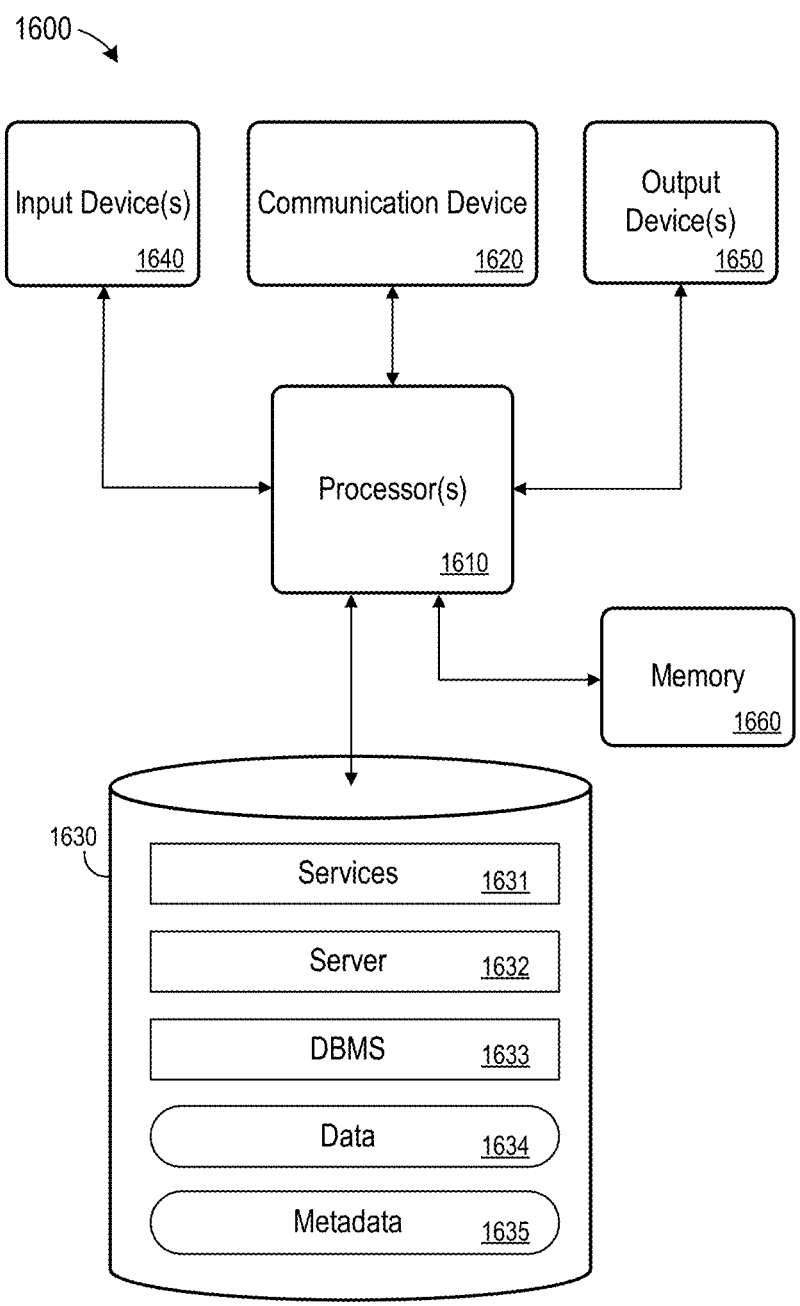
FIG. 16 is a block diagram of an apparatus according to some embodiments.

FIG. 16 is a block diagram of apparatus 1600 according to some embodiments. Apparatus 1600 may comprise a general-purpose computing apparatus and may execute program code to perform any of the functions described herein. Apparatus 1600 may comprise an implementation of server 130, DBMS 120 and data store 110 of FIG. 1 in some embodiments. Apparatus 1600 may include other unshown elements according to some embodiments.

Apparatus 1600 includes processor(s) 1610 operatively coupled to communication device 1620, data storage device 1630, one or more input devices 1640, one or more output devices 1650 and memory 1660. Communication device 1620 may facilitate communication with external devices, such as a reporting client, or a data storage device. Input device(s) 1640 may comprise, for example, a keyboard, a keypad, a mouse or other pointing device, a microphone, knob or a switch, an infra-red (IR) port, a docking station, and/or a touch screen. Input device(s) 1640 may be used, for example, to enter information into apparatus 1600. Output device(s) 1650 may comprise, for example, a display (e.g., a display screen) a speaker, and/or a printer.

Data storage device 1630 may comprise any appropriate persistent storage device, including combinations of magnetic storage devices (e.g., magnetic tape, hard disk drives and flash memory), optical storage devices, Read Only Memory (ROM) devices, etc., while memory 1660 may comprise Random Access Memory (RAM), Storage Class Memory (SCM) or any other fast-access memory.

Services 1631, server 1632 and DBMS 1633 may comprise program code executed by processor 1610 to cause apparatus 1600 to perform any one or more of the processes described herein. Embodiments are not limited to execution of these processes by a single apparatus.

Data 1634 and metadata 1635 (either cached or a full database) may be stored in volatile memory such as memory 1660. Metadata 1635 may include information regarding dimensions, dimension values, and measure names associated with the data sources stored within data 1634. Data storage device 1630 may also store data and other program code for providing additional functionality and/or which are necessary for operation of apparatus 1600, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A computing system comprising:
a memory storing instructions for outputting a user interface; and
a processor configured to execute the instructions, wherein, when executed, the instructions are configured to cause the processor to:
display the user interface comprising a display area where one or more values of a data source are visually depicted;
detect, via the user interface, a selection of a point source location via the display area which is associated with a first data value from among the one or more data values;
generate a point visualization that comprises additional information associated with the first data value associated with the point source location; and
display, via the display area of the user interface, the point visualization which includes the additional information associated with the first data value, and a visual link connecting the point visualization to the point source location.

2. The computing system of claim 1, wherein the visual link comprises a direct line between an outer boundary of the point visualization and the point source location.

3. The computing system of claim 1, wherein the visual link comprises a chain including a curved line that links an outer boundary of the point visualization and the point source location.

4. The computing system of claim 1, wherein the processor is further configured to move a position of the point visualization within the display area while preserving the visual link connecting the point visualization to the point source location.

5. The computing system of claim 1, wherein an outer boundary of the point visualization and an outer boundary of a visualization including the one or more data values do not overlap one another within the display area.

6. The computing system of claim 1, wherein the processor is further configured to display a menu comprising a pin option associated with the first data value, in response to detecting the selection of the point source location via the display area.

7. The computing system of claim 6, wherein the processor generates and displays the point visualization in response to detecting a selection of the pin icon.

8. The computing system of claim 1, wherein the additional information within the point visualization comprises underlying sub-values of the first data value from the data source which are revealed via the point visualization.

9. A method comprising:
displaying, via a hardware processor, a user interface comprising a display area where one or more values of a data source are visually depicted;
detecting, via the hardware processor and from the user interface, a selection of a point source location via the display area which is associated with a first data value from among the one or more data values;
generating, via the hardware processor, a point visualization that comprises additional information associated with the first data value associated with the point source location; and
displaying, via the hardware processor on the display area of the user interface, the point visualization which includes the additional information associated with the first data value, and a visual link connecting the point visualization to the point source location.

10. The method of claim 9, wherein the visual link comprises a direct line between an outer boundary of the point visualization and the point source location.

11. The method of claim 9, wherein the visual link comprises a chain including a curved line that links an outer boundary of the point visualization and the point source location.

12. The method of claim 9, further comprising moving a position of the point visualization within the display area while preserving the visual link connecting the point visualization to the point source location.

13. The method of claim 9, wherein an outer boundary of the point visualization and an outer boundary of a visualization including the one or more data values do not overlap one another within the display area.

14. The method of claim 9, further comprising displaying a menu comprising a pin option associated with the first data value, in response to detecting the selection of the point source location via the display area.

15. The method of claim 9, wherein the generating and the displaying of the point visualization is performed in response to detecting a selection of the pin icon.

16. The method of claim 9, wherein the additional information within the point visualization comprises underlying sub-values of the first data value from the data source which are revealed via the point visualization.

17. A non-transitory computer readable medium storing program instructions which when executed are configured to cause a computer to perform a method comprising:
displaying a user interface comprising a display area where one or more values of a data source are visually depicted;
detecting, via the user interface, a selection of a point source location via the display area which is associated with a first data value from among the one or more data values;
generating a point visualization that comprises additional information associated with the first data value associated with the point source location; and
displaying, via the display area of the user interface, the point visualization which includes the additional information associated with the first data value, and a visual link connecting the point visualization to the point source location.

18. The non-transitory computer readable medium of claim 17, wherein the visual link comprises a direct line between an outer boundary of the point visualization and the point source location.

19. The non-transitory computer readable medium of claim 17, wherein the visual link comprises a chain including a curved line that links an outer boundary of the point visualization and the point source location.

20. The non-transitory computer readable medium of claim 17, wherein the method further comprises moving a position of the point visualization within the display area while preserving the visual link connecting the point visualization to the point source location.

* * * * *